United States Patent [19]

Nakano et al.

[11] 4,403,171
[45] Sep. 6, 1983

[54] PHOSPHOR, PROCESS FOR PREPARATION THEREOF AND LAMP CONTAINING THE SAME

[75] Inventors: Masaki Nakano, Hamura; Shinkichi Tanimizu, Kokubunji, both of Japan

[73] Assignee: Hitachi, Ltd., Tokyo, Japan

[21] Appl. No.: 336,098

[22] Filed: Dec. 31, 1981

[30] Foreign Application Priority Data

Jan. 9, 1981 [JP] Japan .................................. 56-1240

[51] Int. Cl.³ .......................................... C09K 11/475
[52] U.S. Cl. .............................. 313/486; 252/301.4 R
[58] Field of Search .................. 252/301.4 R; 313/486

[56] References Cited

FOREIGN PATENT DOCUMENTS 628579 10/1961 Canada .......................... 252/301.4 R
2410134 9/1974 Fed. Rep. of Germany ... 252/301.4 R
175162 11/1965 U.S.S.R. ....................... 252/301.4 R

*Primary Examiner*—Jack Cooper
*Attorney, Agent, or Firm*—Antonelli, Terry & Wands

[57] ABSTRACT

Disclosed is a phosphor emitting a green to bluish white fluorescence, which is represented by the following general formula:

$$M_{3-x}Tb_xBO_6$$

wherein M stands for at least one element selected from the group consisting of La, Gd and Y, and x is a number of $0 < x \leq 2.0$.

This phosphor has a high brightness, and in a fluorescent lamp prepared by using this phosphor, degradation of the brightness is very small.

23 Claims, 6 Drawing Figures

PHOSPHOR, PROCESS FOR PREPARATION THEREOF AND LAMP CONTAINING THE SAME

BACKGROUND OF THE INVENTION

1. Field of the Invention

The present invention relates to a rate earth borate phosphor and a process for the preparation thereof, and the present invention also relates to a fluorescent screen comprising this phosphor.

2. Description of the Prior Art

As the known rare earth borate phosphor, there can be mentioned, for example, a phosphor disclosed in Japanese Patent Application Laid-Open Specification No. 33986/78, which is represented by the following general formula:

$$La_{1-x-y-z}Gd_xA'_yA''_zB_3O_6$$

wherein A' is Bi or Ce, A'' is Tb or dy, x is a number of $0 \leq x \leq 1$, y is a number of $0.001 \leq y \leq 0.80$ and z is a number of $0 \leq z \leq 0.60$, with the proviso that x, y and z satisfy the requirement of $x+y+z \leq 1$.

The host lattice of this phosphor is composed of a lanthanoid sesquioxide $Ln_2O_3$ (in which Ln is La or Gd) and $B_2O_3$ at a molar ratio of 1:3 and the phosphor emits a peculiar fluorescence determined by the activator A' and/or A''. As another rare earth borate phosphor, there can be mentioned $Gd_2O_3.B_2O_3$, $La_2O_3.B_2O_3$ activated with trivalent europium ($Eu^{3+}$), which is disclosed J. Electrochem. Soc., 111, 12, page 1363 (1964). The host lattice of the phosphor of this type is composed of a lanthanoid sesquioxide $Ln_2O_3$ (in which Ln is Gd or La) and $B_2O_3$ at a molar ratio of 1:1 and the phosphor emits a red fluorescence inherent of $Eu^{3+}$.

These known phosphors, however, are still insufficient in the brightness and the maintenance of fluorescent characteristics.

SUMMARY OF THE INVENTION

It is a primary object of the present invention to provide a novel phosphor having a high brightness, in which fluorescent characteristics can be maintained for a long time and a process for the preparation of this novel phosphor.

This and other objects of the present invention can be attained by a phosphor represented by the following general formula:

$$M_{3-x}Tb_xBO_6$$

wherein M stands for at least one element selected from the group consisting of La, Gd and Y, and x is a number of $0 \leq x \leq 2.0$.

DETAILED DESCRIPTION OF THE PREFERRED EMBODIMENTS

Figure 1:
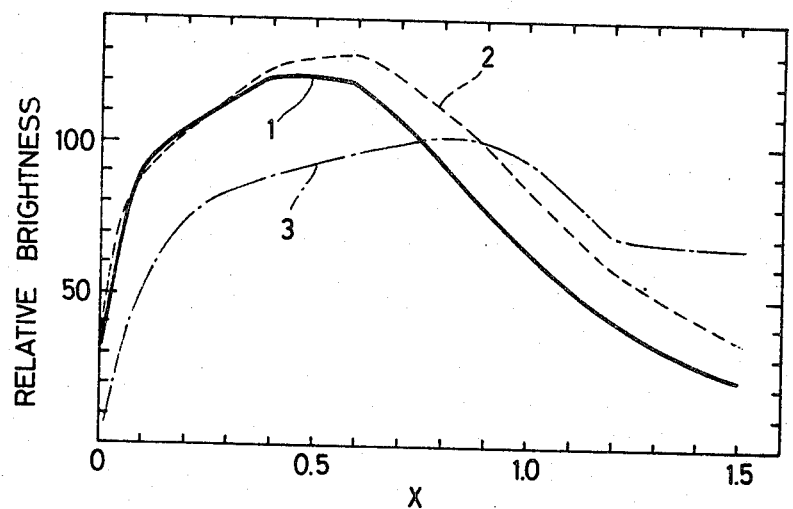
FIG. 1 is a diagram showing the relation between the Tb concentration and the relative brightness, which is given to illustrate the present invention.

In addition to the above-mentioned rare earth borate host lattices having a constituent molar ratio of 1:3 or 1:1, there is known a borate in which the constituent molar ratio is 3:1. For example, the presence of $3La_2O_3.B_2O_3$, that is, $La_3BO_6$, is confirmed in J. American Ceramic Soc., 44, 2, page 87 (1961). However, a borate phosphor having a constituent molar ratio of 3:1 has not been reported.

We found that when a predetermined fluoride is used as the flux, there can be obtained a Tb-activated phosphor represented by the above general formula, which is composed of a lanthanoid sesquioxide and boric anhydride at a molar ratio of 3:1.

When Gd is used as the element M in the general formula, a phosphor having a highest brightness is obtained. Therefore, Gd is most preferred as M. When two or more of the elements are used as M, it is preferred that Gd be contained in an amount of at least 80 mole %, especially at least 90 mole %, based on M. The higher is the Gd content, the higher is the brightness. When Y is used as M, the brightness is reduced. It is preferred that Y be used in combination with other element so that the Y content is not higher than 5 mole %.

The value of x is limited within the above-mentioned range because the brightness of the phosphor is high within this range. Even if the amount of Tb is very small, emission is observed, and when x is in the range of $0.01 \leq x \leq 1.5$, the brightness of the phosphor is significantly improved. Therefore, it is preferred that the value of x be adjusted within this range. When the value x is in the range of $0.1 \leq x \leq 0.8$, the brightness of the phosphor is most improved. Accordingly, it is most preferred that the value x be adjusted within the above range.

The phosphor of the present invention can be obtained by firing oxides of rare earth elements and/or compounds of rare earth elements that can be converted to said oxides by firing, boric acid and/or boric anhydride, and at least one fluoride selected from the group consisting of fluorides represented by the following general formula:

$$M'BF_4$$

wherein M' stands for at least one element or atomic group selected from the group consisting of Li, K, Na and $NH_4$, fluorides represented by the following general formula:

$$M'_2SiF_6$$

wherein M' is as defined above, and fluorides represented by the following general formula:

$$M''SiF_6$$

wherein M'' stands for at least one element selected from the group consisting of Zn, Mg, Pb, Ca, Sr and Ba.

It is preferred that boric acid and/or boric anhydride be incorporated in such an amount that the amount of boron is 1.0 to 1.5 times the stoichiometric amount of boron in the phosphor represented by the above general formula. If the amount of boron exceeds 1.5 times the stoichiometric amount, the brightness of the obtained phosphor is reduced. In order to obtain a phosphor having a highly improved brightness, it is preferred that the amount of boric acid and/or boric anhydride be determined so that the amount of boron is 1.0 to 1.05 times the stoichiometric amount.

It is preferred that the fluoride acting as the flux be incorporated in an amount of 2 to 50% by weight, especially 5 to 50% by weight, based on the starting materials of the phosphor. If the amount of the fluoride is smaller than 2% by weight, the fluoride exerts no substantial activity as the flux.

Even if the fluoride is incorporated in an amount exceeding 50% by weight, a phosphor can be prepared. In this case, however, a long time is necessary for removing the flux from the prepared phospor, and use of a large quantity of the flux is not preferred from the economical viewpoint. Therefore, it is preferred that the amount of the flux be adjusted within the abovementioned range.

It is preferred that firing be carried out after prefiring has been conducted in air at a temperature from 700° to 1000° C. for 2 to 5 hours. When compounds other than oxides are used as the starting materials of the phosphor and they are converted to oxides, the process of the prefiring is indispensable. Furthermore, it is preferred that firing be conducted 2 or 3 times rather than 1 time (these firings will be referred to as "first firing", "second firing" and "third firing" hereinafter). It is preferred that each firing be conducted at a temperature of 1000° to 1300° C. in an inert gas, nitrogen or a weakly reducing atmosphere for 2 to 10 hours. It is especially preferred that firing be conducted at a temperature of 1150° to 1250° C. for 3 to 10 hours, because the brightness is improved and degradation of the brightness at the time of baking in air is reduced. The weakly reducing atmosphere may be formed by mixing an inert gas such as $N_2$ with a small amount of a reducing gas such as hydrogen, carbon dioxide gas or carbon monoxide gas. It is preferred that the amount of the reducing gas to be mixed be 3 to 20% by volume, especially 5 to 10% by volume. It is preferred that before each of first or second or third firing, the sample be once cooled, pulverized and re-mixed.

The flux may be incorporated before prefiring or before first, second or third firing. If firing is carried out at least one time after incorporation of the flux, the brightness can be greatly improved.

The phosphor of the present invention may be used without leaching. However it is better to use after water washing and drying. It is preferred that the phosphor be used after the fired product is pulverized, treated with a 0.1 to 1 N weak acid, washed with water sufficiently and dried. By this method, the brightness of the phosphors can be highly improved. As the acid, there is used an aqueous solution of HCl, $HNO_3$ or $H_2SO_4$.

In the phosphor of the present invention, no substantial degradation of the brightness is caused at the step of baking in air for use in a fluorescent lamp. Moreover, the lumen maintenance of a fluorescent lamp coated with the phosphor of the present invention is much improved compared with the halophosphate lamps. Accordingly, if the phosphor of the present invention is used singly or in combination with other phosphors, an excellent fluorescent lamp can be obtained.

The present invention will now be described in detail with reference to the following examples.

EXAMPLES 1 THROUGH 6

In order to obtain phosphors of the general formula shown in Table 1, starting materials except $(NH_4)_2SiF_6$ as the flux were taken at molar ratios shown in Table 1 and sufficiently mixed. Each mixture was prefired at a temperature of 700° C. for 2 hours, and the fired product was cooled, pulverized and re-mixed. The prefired mixture were then subjected first firing. In case of Example 2, after $(NH_4)_2SiF_6$ had been added in an amount shown in Table 1 (% by weight based on the starting materials of the phosphor; the same will hold good hereinafter), first firing was carried out. In Examples 3 through 6, the fired mixtures were cooled, pulverized, mixed and subjected to second firing. In Example 4 and 6, $(NH_4)_2SiF_6$ was added before second firing. That is, in these Examples, the flux was added before final firing. In Table 1, $H_2/N_2$ means a weakly reducing atmosphere comprising 5% by volume of $H_2$ and 95% by volume of $N_2$ (the same will hold good hereinafter).

The products passed through 300 mesh screen were $Y_{2.8}Tb_{0.2}BO_6$ in Examples 1 and 2, phosphors $La_{2.8}Tb_{0.2}BO_6$ in Examples 3 and 4 and phosphors $Gd_{2.8}Tb_{0.2}BO_6$ in Examples 5 and 6.

Each phosphor emits a green fluorescence when excited by 254 nm mercury vapor resonance rays. The relative brightness of the samples obtained by the above procedure are shown in Table 1. The upper value of the relative brightness is a value calculated based on the supposition that the brightness of $Zn_2SiO_4$:Mn (NBS-1021, one of the standard phosphor samples issued by The National Bureau of Standards, Washington D.C., U.S.A.) is 100%, and the lower value of the relative brightness is a value calculated based on the supposition that the brightness of the flux-free phosphor (the phosphors of Examples 1, 3 and 5 for the phosphors of Examples 2, 4 and 6, respectively) is 100%.

TABLE 1

|  | Example 1 | Example 2 | Example 3 | Example 4 | Example 5 | Example 6 |
|---|---|---|---|---|---|---|
| General Formula |  |  |  |  |  |  |
| M | Y | Y | La | La | Gd | Gd |
| x | 0.2 | 0.2 | 0.2 | 0.2 | 0.2 | 0.2 |
| Starting Materials |  |  |  |  |  |  |
| $Y_2O_3$ | 1.4 | 1.4 | — | — | — | — |
| $La_2O_3$ | — | — | 1.4 | 1.4 | — | — |
| $Gd_2O_3$ | — | — | — | — | 1.4 | 1.4 |
| $Tb_4O_7$ | 0.05 | 0.05 | 0.05 | 0.05 | 0.05 | 0.05 |
| $H_3BO_3$ | 1.05 | 1.05 | 1.05 | 1.05 | 1.05 | 1.05 |
| $(NH_4)_2SiF_6$ (% by weight) | 0 | 20 | 0 | 20 | 0 | 20 |
| Firing Conditions |  |  |  |  |  |  |
| Preliminary Firing | 700° C., 2 hours in air | | | | | |
| First Firing | 1200° C., 2 hours in $H_2N_2$ | 1200° C., 2 hours in $H_2N_2$ | 1200° C., 2 hours in nitrogen | 1200° C., 2 hours in nitrogen | 1200° C., 2 hours in nitrogen | 1200° C., 2 hours in nitrogen |
| Second Firing | — | — | 1200° C., 2 hours in nitrogen | 1200° C., 2 hours in nitrogen | 1200° C., 2 hours in $H_2/N_2$ | 1200° C., 2 hours in $H_2/N_2$ |
| Relative Brightness (%) |  |  |  |  |  |  |

TABLE 1-continued

|  | Example 1 | Example 2 | Example 3 | Example 4 | Example 5 | Example 6 |
|---|---|---|---|---|---|---|
| to $Zn_2SiO_4$:Mn to phosphor | 5.4 | 39.4 | 3.1 | 74.6 | 2.3 | 103.0 |
| free of $(NH_4)_2SiF_6$ | 100 | 730 | 100 | 2410 | 100 | 4480 |

EXAMPLE 7 THROUGH 16

Phosphors $Gd_{3-x}Tb_xBO_6$ were prepared by using starting materials shown in Table 2 in the same manner as described in Example 6. Incidentally, $(NH_4)_2SiF_6$ was added before second firing. The relative brightness of each phosphor (to $Zn_2SiO_4$:Mn) is shown in Table 2. The upper value of the relative brightness is a value of a product obtained only by pulverizing the obtained phosphor, and the lower value of the relative brightness is a value of a product obtained by pulverizing the obtained phosphor, washing the pulverized phosphor with 0.6 N HCl, washing the treated phosphor sufficiently with water and drying the washed phosphor. The relation between the Tb concentration and the relative brightness of the hydrochloric acid-treated phosphor is shown by curve 1 in FIG. 1. As is apparent from FIG. 1, a highest brightness was obtained when x was about 0.4.

In order to examine the brightness maintenance ratio after baking in air, the hydrochloric acid-treated phosphor $Gd_{2.6}Tb_{0.4}BO_6$ in which x was 0.4 was re-fired at 620° C. for 10 minutes in air. The ratio of the brightness after re-firing to the brightness before re-firing that is, the brightness maintenance ratio after baking in air, was 98.9%. And also there was no temperature quenching of the brightness even at temperatures of 150° C. or greater. Then the phosphors of the present invention can be utilized for a high-loaded low pressure type fluorescent lamp having an operated temperature range of approximately 150° C. or greater.

EXAMPLES 17 THROUGH 26

Phosphors of the general formula shown in Table 3, that is, the same phosphors $Gd_{3-x}Tb_xBO_6$ as those of Examples 7 through 16, were prepared in the same manner as in Examples 7 through 16 except that second firing was carried out at 1200° C. for 2 hours in $H_2/N_2$. Since the amounts of the starting materials corresponding to the value x were the same as those in Examples 7 through 16, they are not shown in Table 3. The relative brightness of each phosphor is shown in Table 3. The upper and lower values are as defined in Table 2. The relative brightness of the HCl-treated phosphor is indicated by curve 2 in FIG. 1. It is seen that the effect of firing in the weakly reducing atmosphere was especially prominent when the Tb concentration was high.

Figure 2:
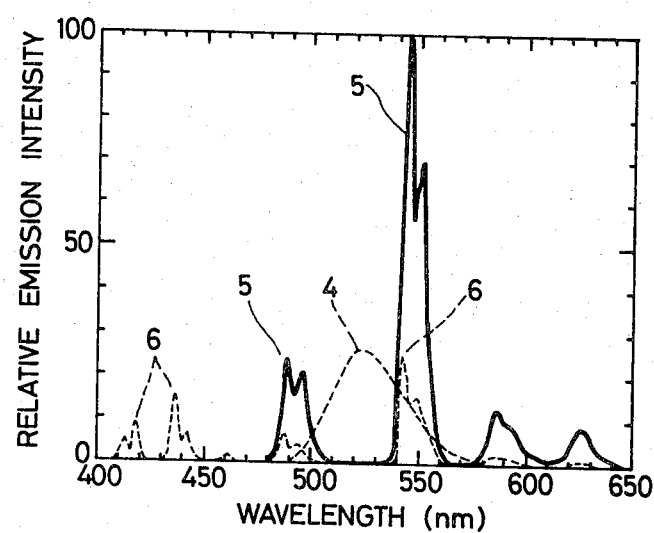
FIGS. 2 and 5 are diagrams showing the fluorescent spectra of the phosphor of the present invention and the conventional phosphor.

The emission spectra of the obtained phosphors excited by mercury vapor resonance rays are shown in FIG. 2. Curve 4 indicates the emission spectrum of NBS-1021, $Zn_2SiO_4$:Mn, curve 5 indicates the emission spectrum of the phosphor obtained in Example 21 and curve 6 indicates the emission spectrum of the phosphor obtained in Example 17. The phosphors having a high Tb concentration emitted a green fluorescence, and the phosphors having a low Tb concentration emitted a bluish white fluorescence.

Figure 3:
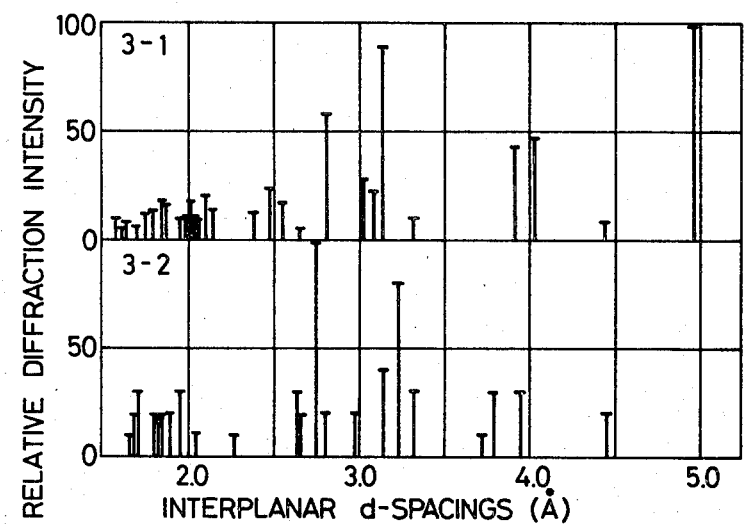
FIG. 3 is a diagram showing the X-ray diffraction patterns of the phosphor of the present invention and the conventional phosphor.

The uppor portion (3-1) of FIG. 3 shows the X-ray diffraction pattern of the known phosphor $(Gd_{0.7}Ce_{0.2}Tb_{0.1})_2O_3 \cdot 3B_2O_3$ composed of rare earth sesquioxides and $B_2O_3$ at a molar ratio of 1:3, and the lower portion (3-2) of FIG. 3 shown the X-ray diffraction pattern of the phosphor obtained in Example 10. Both the patterns are apparently different from each other.

Figure 4:
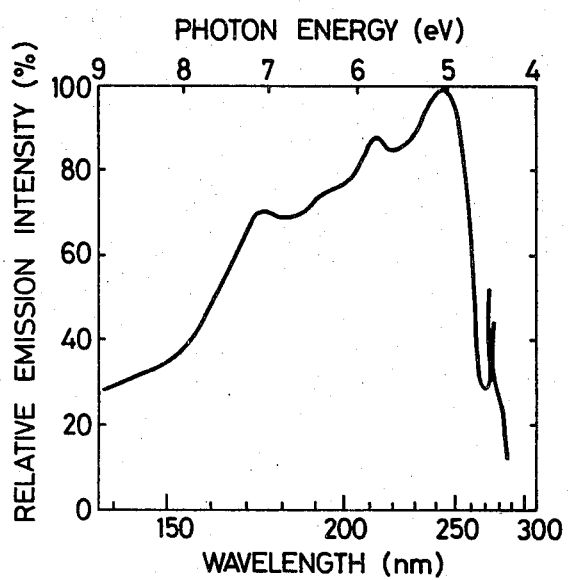
FIG. 4 is a diagram illustrating the exciting spectrum of the phosphor of the present invention.

The excited spectrum of the acid-treated phosphor obtained in Example 24 is shown in FIG. 4.

TABLE 3

| Example No. | General Formula M | x | Relative Brightness (%) after pulverization | after HCl treatment |
|---|---|---|---|---|
| 17 | Gd | 0.01 | 32.5 | 36.2 |

TABLE 2

|  | Example 7 | Example 8 | Example 9 | Example 10 | Example 11 | Example 12 | Example 13 | Example 14 | Example 15 | Example 16 |
|---|---|---|---|---|---|---|---|---|---|---|
| General Formula |  |  |  |  |  |  |  |  |  |  |
| M | Gd | Gd | Gd | Gd | Gd | Gd | Gd | Gd | Gd | Gd |
| x | 0.01 | 0.05 | 0.10 | 0.20 | 0.40 | 0.50 | 0.60 | 0.80 | 1.20 | 1.50 |
| Starting Materials |  |  |  |  |  |  |  |  |  |  |
| $Gd_2O_3$ | 1.495 | 1.475 | 1.45 | 1.40 | 1.30 | 1.25 | 1.20 | 1.10 | 0.90 | 0.75 |
| $Tb_4O_7$ | 0.0025 | 0.0125 | 0.025 | 0.05 | 0.1 | 0.125 | 0.15 | 0.2 | 0.3 | 0.375 |
| $H_3BO_3$ | 1.05 | 1.05 | 1.05 | 1.05 | 1.05 | 1.05 | 1.05 | 1.05 | 1.05 | 1.05 |
| $(NH_4)_2SiF_6$ (% by weight) | 20 | 20 | 20 | 20 | 20 | 20 | 20 | 20 | 20 | 20 |
| Firing Conditions |  |  |  |  |  |  |  |  |  |  |
| Preliminary Firing | 700° C., 2 hours in air |  |  |  |  |  |  |  |  |  |
| First Firing | 1200° C., 2 hours in nitrogen |  |  |  |  |  |  |  |  |  |
| Second Firing | 1200° C., 2 hours in nitrogen |  |  |  |  |  |  |  |  |  |
| Relative Brightness (%) |  |  |  |  |  |  |  |  |  |  |
| Pulverized Phosphor | 30.4 | 64.2 | 75.8 | 90.1 | 116.5 | 110.2 | — | 91.4 | 38.3 | 21.4 |
| HCl-Treated Phosphor | 32.5 | 70.0 | 91.4 | 102.1 | 121.1 | — | 119.4 | 91.4 | 44.5 | 25.1 |

TABLE 3-continued

| Example No. | General Formula M | x | Relative Brightness (%) after pulverization | after HCl treatment |
|---|---|---|---|---|
| 18 | Gd | 0.05 | 64.8 | 76.9 |
| 19 | Gd | 0.10 | 75.6 | 90.1 |
| 20 | Gd | 0.20 | 88.6 | 103.0 |
| 21 | Gd | 0.40 | 108.6 | 124.4 |
| 22 | Gd | 0.50 | — | 127.2 |
| 23 | Gd | 0.60 | — | 129.1 |
| 24 | Gd | 0.80 | 96.2 | 111.8 |
| 25 | Gd | 1.20 | 51.5 | 60.4 |
| 26 | Gd | 1.50 | 31.0 | 37.5 | tration and the relative brightness of the hydrochloric acid-treated phosphor is indicated by curve 3 in FIG. 1. From this curve, it is seen that the highest relative brightness was obtained when x was about 0.8.

Figure 5:
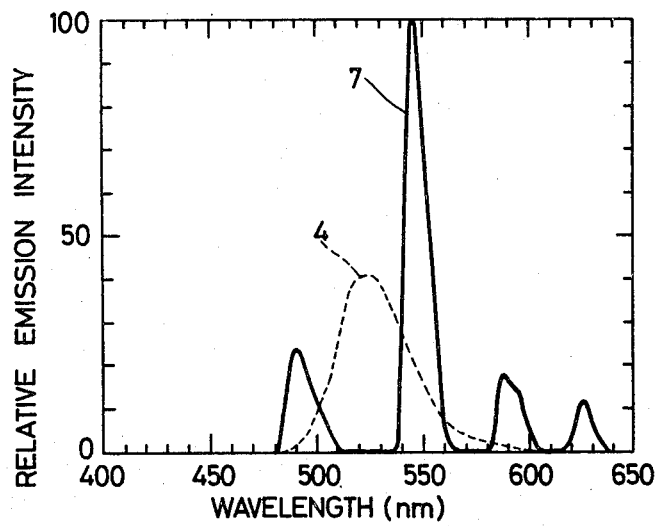

The emission spectrum of the phosphor obtained in Example 33 when excited with mercury vapor resonance rays is shown by curve 7 in FIG. 5. Incidentally, curve 4 indicates the emission spectrum of NBS-1021, $Zn_2SiO_4$:Mn.

TABLE 4

| Example No. | General Formula M | x | Starting Materials $La_2O_3$ | $Tb_4O_7$ | $H_3BO_4$ | $(NH_4)_2SiF_6$ (% by weight) | First Firing | Second Firing | Third Firing | Relative Brightness (%) Pulverization | Water Washing | HCl Treatments |
|---|---|---|---|---|---|---|---|---|---|---|---|---|
| 27 | La | 0.01 | 1.495 | 0.0025 | 1.05 | 20 | 700° C., 2 hours in air | 1200° C., 2 hours in nitrogen | 1200° C., 2 hours in nitrogen | 6.9 | — | 7.6 |
| 28 | La | 0.05 | 1.475 | 0.0125 | 1.05 | 20 | 700° C., 2 hours in air | 1200° C., 2 hours in nitrogen | 1200° C., 2 hours in nitrogen | 31.4 | — | 34.1 |
| 29 | La | 0.10 | 1.45 | 0.025 | 1.05 | 20 | 700° C., 2 hours in air | 1200° C., 2 hours in nitrogen | 1200° C., 2 hours in nitrogen | 47.2 | — | 53.5 |
| 30 | La | 0.20 | 1.4 | 0.05 | 1.05 | 20 | 700° C., 2 hours in air | 1200° C., 2 hours in nitrogen | 1200° C., 2 hours in nitrogen | 68.2 | 72.4 | 74.6 |
| 31 | La | 0.40 | 1.3 | 0.10 | 1.05 | 20 | 700° C., 2 hours in air | 1200° C., 2 hours in nitrogen | 1200° C., 2 hours in nitrogen | 84.1 | — | 88.5 |
| 32 | La | 0.60 | 1.2 | 0.15 | 1.05 | 20 | 700° C., 2 hours in air | 1200° C., 2 hours in nitrogen | 1200° C., 2 hours in nitrogen | 90.3 | 93.2 | 96.8 |
| 33 | La | 0.80 | 1.1 | 0.20 | 1.05 | 20 | 700° C., 2 hours in air | 1200° C., 2 hours in nitrogen | 1200° C., 2 hours in nitrogen | 99.0 | — | 101.5 |
| 34 | La | 1.00 | 1.0 | 0.25 | 1.05 | 20 | 700° C., 2 hours in air | 1200° C., 2 hours in nitrogen | 1200° C., 2 hours in nitrogen | 86.5 | — | 94.1 |
| 35 | La | 1.20 | 0.9 | 0.30 | 1.05 | 20 | 700° C., 2 hours in air | 1200° C., 2 hours in nitrogen | 1200° C., 2 hours in nitrogen | 63.1 | — | 69.4 |
| 36 | La | 1.50 | 0.75 | 0.375 | 1.05 | 20 | 700° C., 2 hours in air | 1200° C., 2 hours in nitrogen | 1200° C., 2 hours in nitrogen | 66.0 | — | 67.9 |

EXAMPLES 27 THROUGH 36

Phosphors $La_{3-x}Tb_xBO_6$ were prepared by using the starting materials shown in Table 4 in the same manner as described in Examples 3 and 4 under conditions shown in Table 4. Incidentally, $(NH_4)_2SiF_6$ was added before second firing. The relative brightness of each phosphor to $Zn_2SiO_4$:Mn is shown in Table 4. The left value is a value of the pulverized phosphor, the middle value is a value of the pulverized, water-washed and dried phosphor, and the right value is a value of the product obtained by pulverizing the phosphor, washing the pulverized phosphor with 0.6 N HCl, washing the treated phosphor sufficiently with water and drying the washed phosphor. The relation between the Tb concentration and the relative brightness of the hydro-

EXAMPLES 37 THROUGH 46

Phosphors $Gd_{2.5}Tb_{0.5}BO_6$ (Examples 37 through 41), $La_{2.8}Tb_{0.2}BO_6$ (Examples 42 and 43) and $Gd_{2.2}Tb_{0.8}BO_6$ (Examples 44, 45 and 46) were prepared by using the starting materials shown in Table 5 under conditions shown in Table 5 in the same manner as in Examples 3 through 6. Incidentally, $(NH_4)_2SiF_6$ was added as the flux before second firing. The relative brightness of each phosphor is shown in Table 5. The left value is a relative value to $Zn_2SiO_4$:Mn and the right value is a relative value to the flux-free phosphor.

Figure 6:
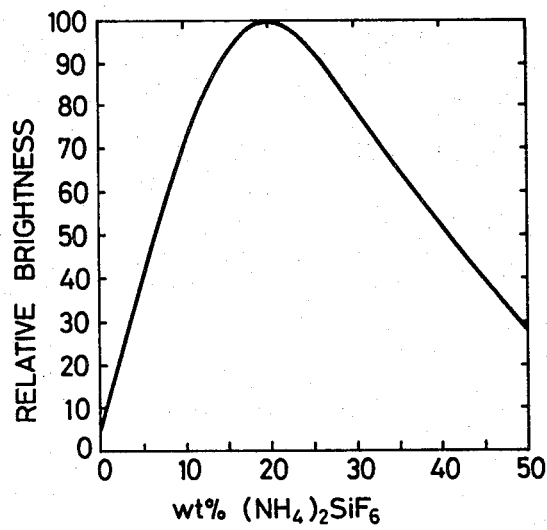
FIG. 6 is a diagram showing the relation between the amount of the flux and the relative emission intensity of the phosphor, which is given to illustrate the present invention.

The relation between the amount of the flux and the relative emission intensity of the obtained phosphor in Examples 37 through 41 is shown in FIG. 6, from which it is seen that a highest brightness was obtained when the amount incorporated of the flux was about 20% by weight.

| Example No. | General Formula M | x | Starting Materials La$_2$O$_3$ | Gd$_2$O$_3$ | Tb$_4$O$_7$ | H$_3$BO$_3$ | B$_2$O$_3$ | (NH$_4$)$_2$SiF$_6$ (% by Weight) | Firing Conditions Preliminary Firing | First Firing | Second Firing | Relative Brightness (%) To Zn$_2$SiO$_4$:Mn | To flux-free phosphor |
|---|---|---|---|---|---|---|---|---|---|---|---|---|---|
| 37 | Gd | 0.5 | — | 1.25 | 0.125 | 1.05 | — | 0 | 700° C., 2 hours in air | 1200° C., 2 hours in nitrogen | 1200° C., 2 hours in H$_2$/N$_2$ | 4.5 | 100 |
| 38 | Gd | 0.5 | — | 1.25 | 0.125 | 1.05 | — | 2 | 700° C., 2 hours in air | 1200° C., 2 hours in nitrogen | 1200° C., 2 hours in H$_2$/N$_2$ | 33.0 | 731 |
| 39 | Gd | 0.5 | — | 1.25 | 0.125 | 1.05 | — | 5 | 700° C., 2 hours in air | 1200° C., 2 hours in nitrogen | 1200° C., 2 hours in H$_2$/N$_2$ | 41.1 | 913 |
| 40 | Gd | 0.5 | — | 1.25 | 0.125 | 1.05 | — | 20 | 700° C., 2 hours in air | 1200° C., 2 hours in nitrogen | 1200° C., 2 hours in H$_2$/N$_2$ | 127.2 | 2820 |
| 41 | Gd | 0.5 | — | 1.25 | 0.125 | 1.05 | — | 50 | 700° C., 2 hours in air | 1200° C., 2 hours in nitrogen | 1200° C., 2 hours in H$_2$/N$_2$ | 36.6 | 813 |
| 42 | La | 0.2 | 1.4 | — | 0.05 | 1.05 | — | 20 | 700° C., 2 hours in air | 1200° C., 2 hours in nitrogen | 1200° C., 2 hours in nitrogen | 62.8 | — |
| 43 | La | 0.2 | 1.4 | — | 0.05 | — | 1.05 | 20 | 700° C., 2 hours in air | 1200° C., 2 hours in nitrogen | 1200° C., 2 hours in nitrogen | 67.5 | — |
| 44 | Gd | 0.80 | — | 1.10 | 0.20 | 1.05 | — | 20 | 900° C., 2 hours in air | 1200° C., 2 hours in nitrogen | 1200° C., 5 hours in H$_2$/N$_2$ | 102.4 | — |
| 45 | Gd | 0.80 | — | 1.10 | 0.20 | 1.10 | — | 20 | 900° C., 2 hours in air | 1200° C., 2 hours in nitrogen | 1200° C., 5 hours in H$_2$/N$_2$ | 101.0 | — |
| 46 | Gd | 0.80 | — | 1.10 | 0.20 | 1.20 | — | 20 | 900° C., 2 hours in air | 1200° C., 2 hours in nitrogen | 1200° C., 5 hours in H$_2$/N$_2$ | 89.7 | — |

EXAMPLES 47 THROUGH 52

Phosphors La$_{0.26}$Gd$_{2.34}$Tb$_{0.4}$BO$_6$ (Examples 47 and 48) and Gd$_{2.5}$Tb$_{0.5}$BO$_6$ (Examples 49 through 52) were prepared by using the starting materials shown in Table 6 under conditions shown in Table 6 in the same manner as in Examples 3 through 6. Incidentally, the flux was added before second firing It was found that the relative brightness was increased to 2160%, 1310% and 913% by addition of Na$_2$SiF$_6$, ZnSiF$_6$ and NH$_4$BF$_4$ as the flux, independently.

TABLE 6

| | Example 47 | Example 48 | Example 49 | Example 50 | Example 51 | Example 52 |
|---|---|---|---|---|---|---|
| General Formula | | | | | | |
| M | La,Gd | La,Gd | Gd | Gd | Gd | Gd |
| x | 0.4 | 0.4 | 0.5 | 0.5 | 0.5 | 0.5 |
| Starting Materials | | | | | | |
| La$_2$O$_3$ | 0.13 | 0.13 | — | — | — | — |
| Gd$_2$O$_3$ | 1.17 | 1.17 | 1.25 | 1.25 | 1.25 | 1.25 |
| Tb$_4$O$_7$ | 0.10 | 0.10 | 0.125 | 0.125 | 0.125 | 0.125 |
| H$_3$BO$_3$ | 1.05 | 1.05 | 1.05 | 1.05 | 1.05 | 1.05 |
| (NH$_4$)$_2$SiF$_6$ (% by weight) | 0 | 20 | 0 | 0 | 0 | 0 |
| Na$_2$SiF$_6$ | 0 | 0 | 0 | 20 | 0 | 0 |

TABLE 6-continued

| | Example 47 | Example 48 | Example 49 | Example 50 | Example 51 | Example 52 |
|---|---|---|---|---|---|---|
| (% by weight) | | | | | | |
| ZnSiF$_6$ | 0 | 0 | 0 | 0 | 20 | 0 |
| NH$_4$BF$_4$ | 0 | 0 | 0 | 0 | 0 | 20 |
| Firing Conditions | | | | | | |
| Preliminary Firing | 700° C., 2 hours in air | | | | | |
| First Firing | 1200° C., 2 hours in nitrogen | | | | | |
| Second Firing | 1200° C., 2 hours in H$_2$/N$_2$ | | | | | |
| Relative Brightness (%) | | | | | | |
| To Zn$_2$SiO$_4$:Mn | 20.1 | 112.5 | 5.5 | 97.5 | 59.0 | 41.1 |
| To Flux-Free Phosphor | 100 | 559 | 100 | 2160 | 1310 | 913 |

What is claimed is:

1. A phosphor represented by the following general formula:

$$M_{3-x}Tb_xBO_6$$

wherein M stands for at least one element selected from the group consisting of La, Gd and Y, and x is a number of $0.1 \leq x \leq 0.8$.

2. A phosphor as set forth in claim 1, wherein M in the general formula is Gd.

3. A phosphor as set forth in claim 1, wherein M in the general formula is Gd and at least one other element selected from said group and Gd occupies at least 80 mole % of M.

4. A phosphor as set forth in claim 1, wherein M in the general formula is La.

5. A phosphor as set forth in claim 1, wherein M in the general formula is Y.

6. A phosphor as set forth in claim 1, wherein M in the general formula is Y and at least one other element, selected from said group and Y occupies at most 5 mol % of M.

7. A fluorescent lamp having incorporated therein a phosphor according to claim 1.

8. A process for the preparation of a phosphor represented by the following general formula:

$$M_{3-x}Tb_xBO_6$$

wherein M stands for at least one element selected from the group consisting of La, Gd and Y, and x is a number of $0.1 \leq x \leq 0.8$,
which comprises heating an oxide of at least one rare earth element selected from the group consisting of La, Gd and Y or a rare earth metal compound capable of being converted to said oxide, an oxide of Tb or a Tb compound capable of being converted to the oxide of Tb by firing and at least one boron compound selected from the group consisting of boric acid and boric anhydride, wherein said heating comprises firing at 1000° C.–1300° C. in an inert gas or weakly reducing gas, and in the presence of at least one fluoride selected from the group consisting of fluorides represented by the following general formula:

$$M'BF_4$$

wherein M' stands for at least one element or atomic group selected from the group consisting of Li, K, Na and NH$_4$,
fluorides represented by the following general formula:

$$M'_2SiF_6$$

wherein M' is as defined above,
and fluorides represented by the following general formula:

$$M''SiF_6$$

wherein M" stands for at least one element selected from the group consisting of Zn, Mg, Pb, Ca, Sr and Ba.

9. A process according to claim 8, wherein the amount of the fluoride is 2 to 50% by weight based on the starting materials of the phosphor.

10. A process according to claim 9, wherein the amount of the fluoride is 5 to 50% by weight based on the starting materials of the phosphor.

11. A process according to claim 8, wherein the boron compound is incorporated in such an amount that the amount of boron in the phosphor is 1.0 to 1.05 times the stoichiometric amount.

12. A process according to claim 8, wherein said heating further comprises pre-firing in air at 700 to 1000° C. prior to firing in an inert gas or weakly reducing gas at 1000° to 1300° C.

13. A process according to claim 8, wherein the product obtained by said heating is treated with a weak acid, washed with water and then dried.

14. A process according to claim 12, wherein the weak acid is a weak acid having a concentration of 0.1 to 1 Normal.

15. A process according to claim 13 or 14, wherein the weak acid is an aqueous solution of HCl, HNO$_3$ or H$_2$SO$_4$.

16. A process according to claim 8, wherein M in the general formula is Gd.

17. A process according to claim 8, wherein M in the general formula is Gd and at least one other element selected from said group and Gd occupies at least 80 mole % of M.

18. A process according to claim 8 or 12, wherein said firing is conducted for 2–10 hours.

19. A process according to claim 8 or 12, wherein said firing in the inert or weakly reducing gas is conducted two or three times, and wherein at least one of the firing steps is carried out in the presence of said at least one fluoride.

20. A process according to claim 12, wherein said pre-firing is conducted for 2–5 hours.

21. A process according to claim 8 or 12, wherein said firing in the inert or weakly reducing gas is conducted at a temperature of 1150°–1250° C. for 3–10 hours.

22. A process according to claim 12, wherein said pre-firing is carried out in the presence of said at least one fluoride.

23. A process according to claim 8 or 12, wherein said firing is carried out in a weakly reducing gas, said weakly reducing gas being a mixture of an inert gas and 3–20% by volume of a reducing gas selected from the group consisting of hydrogen, carbon dioxide and carbon monoxide.

* * * * *